US011058955B2

(12) United States Patent
Chan et al.

(10) Patent No.: US 11,058,955 B2
(45) Date of Patent: Jul. 13, 2021

(54) TECHNIQUES FOR MANAGING VIDEO GAME ASSETS OF VIEWERS AND HOSTS OF VIDEO GAME BROADCASTS AND RELATED SYSTEMS AND METHODS

(71) Applicant: Harmonix Music Systems, Inc., Boston, MA (US)

(72) Inventors: Brian Seong-chi Chan, Cambridge, MA (US); Daniel Aaron Sproul, Jamaica Plain, MA (US); Michael Verrette, Medford, MA (US); Ryan William Challinor, Cambridge, MA (US)

(73) Assignee: Harmonix Music Systems, Inc., Boston, MA (US)

( * ) Notice: Subject to any disclaimer, the term of this patent is extended or adjusted under 35 U.S.C. 154(b) by 0 days.

(21) Appl. No.: 16/720,875

(22) Filed: Dec. 19, 2019

(65) Prior Publication Data
US 2020/0197816 A1    Jun. 25, 2020

Related U.S. Application Data

(60) Provisional application No. 62/784,172, filed on Dec. 21, 2018.

(51) Int. Cl.
*A63F 13/79* (2014.01)
*A63F 13/58* (2014.01)
*A63F 13/35* (2014.01)

(52) U.S. Cl.
CPC .............. *A63F 13/79* (2014.09); *A63F 13/35* (2014.09); *A63F 13/58* (2014.09)

(58) Field of Classification Search
None
See application file for complete search history.

(56) References Cited

U.S. PATENT DOCUMENTS

| | | | |
|---|---|---|---|
| 2017/0006322 A1* | 1/2017 | Dury | A63F 13/49 |
| 2017/0011554 A1* | 1/2017 | Burba | A63F 13/525 |
| 2018/0001194 A1* | 1/2018 | Sherwani | A63F 13/79 |
| 2018/0001200 A1* | 1/2018 | Tokgoz | A63F 13/52 |
| 2018/0361237 A1* | 12/2018 | Perlman | H04L 65/80 |
| 2019/0046886 A1* | 2/2019 | George | A63F 13/86 |

OTHER PUBLICATIONS

International Search Report and Written Opinion dated Mar. 19, 2020 in connection with International Application No. PCT/US0219/067761.
PCT/US2019/067761, dated Mar. 19, 2020, International Search Report and Written Opinion.

* cited by examiner

*Primary Examiner* — Jason T Yen
(74) *Attorney, Agent, or Firm* — Wolf, Greenfield & Sacks, P.C.

(57) ABSTRACT

Embodiments relate to sharing a video game asset associated with a viewer with a player of a video game broadcast. A video stream of gameplay of a video game is received, wherein the video game is being played by a player using a first computing device. The received video stream is broadcast to a second computing device associated with a viewer. Data is received, from the second computing device, indicative of a request to modify a video game asset associated with a second account of the viewer so that the video game asset is available to the player through a first account of the player. The received data is processed to cause the video game asset to be available to the player through the first account.

20 Claims, 4 Drawing Sheets

TECHNIQUES FOR MANAGING VIDEO GAME ASSETS OF VIEWERS AND HOSTS OF VIDEO GAME BROADCASTS AND RELATED SYSTEMS AND METHODS

RELATED APPLICATIONS

This Application claims priority under 35 U.S.C. § 119(e) to U.S. Provisional Application Ser. No. 62/784,172, filed on Dec. 21, 2018, entitled TECHNIQUES FOR MANAGING VIDEO GAME ASSETS OF VIEWERS AND HOSTS OF VIDEO GAME BROADCASTS AND RELATED SYSTEMS AND METHODS, which is herein incorporated by reference in its entirety.

BACKGROUND

A number of different platforms exist to allow a user playing a video game to share aspects of their gameplay experience with others. One such type of platform, sometimes referred to as a "streaming platform," allows the user playing the video game to broadcast video of their gameplay to an audience. This can make playing a video game less of a solitary experience and more of a communal experience, because members of the audience can view and comment on the gameplay while the player is actively playing the game.

SUMMARY

The techniques described herein, in some embodiments, relate to managing video game assets, including allowing users to share video game assets. In some embodiments, a viewer watching a stream of a player's video gameplay can share a video game asset with the player so that the player can use the video game asset during gameplay. The techniques can allow prior gameplay by one user (e.g., by a viewer) to be incorporated into current gameplay of another user (e.g., by a player).

Some embodiments relate to a computer-implemented method of sharing a video game asset associated with a viewer with a player of a video game broadcast. The method includes using at least one computer hardware processor to receive a video stream of gameplay of a video game, wherein the video game is being played by a player using a first computing device, broadcast the received video stream to a second computing device associated with a viewer, receive, from the second computing device, data indicative of a request to modify a video game asset associated with a second account of the viewer so that the video game asset is available to the player through a first account of the player, and process the received data to cause the video game asset to be available to the player through the first account.

In some examples, processing the data includes generating, based on the received data, a request to modify the first account, the second account, or both, so that the video game asset is available to the player through the first account, and transmitting the request to one or more third computing devices associated with the video game.

In some examples, the one or more third computing devices associated with the video game include a video game server providing one or more aspects of the video game.

In some examples, processing the data includes modifying the first account, the second account, or both, so that the video game asset is available to the player through the first account.

In some examples, the method includes determining, based on the received data, a time period for which the player is to have access to the video game asset, and processing the received data includes processing the received data to cause the video game asset to be available to the player through the first account for the time period.

In some examples, the method includes receiving, from the first computing device, second data indicative of the player using the video game asset, and processing the received second data to remove access to the video game asset from both the first account and the second account.

In some examples, the method includes receiving authentication data, wherein the authentication data is associated with the player, the viewer, or both, and authenticating, based on the received authentication data, the player, the viewer, or both.

Some embodiments relate to an apparatus configured to share a video game asset associated with a viewer with a player of a video game broadcast. The apparatus includes a processor in communication with a memory. The processor is configured to execute instructions stored in the memory that cause the processor to perform receiving a video stream of gameplay of a video game, wherein the video game is being played by a player using a first computing device, broadcasting the received video stream to a second computing device associated with a viewer, receiving, from the second computing device, data indicative of a request to modify a video game asset associated with a second account of the viewer so that the video game asset is available to the player through a first account of the player, and processing the received data to cause the video game asset to be available to the player through the first account.

In some examples, processing the data includes generating, based on the received data, a request to modify the first account, the second account, or both, so that the video game asset is available to the player through the first account, and transmitting the request to one or more third computing devices associated with the video game.

In some examples, the one or more third computing devices associated with the video game include a video game server providing one or more aspects of the video game.

In some examples, processing the data includes modifying the first account, the second account, or both, so that the video game asset is available to the player through the first account.

In some examples, the processor is further configured to execute instructions in the memory that cause the processor to perform determining, based on the received data, a time period for which the player is to have access to the video game asset, and processing the received data includes processing the received data to cause the video game asset to be available to the player through the first account for the time period.

In some examples, the processor is further configured to execute instructions in the memory that cause the processor to perform receiving, from the first computing device, second data indicative of the player using the video game asset, and processing the received second data to remove access to the video game asset from both the first account and the second account.

In some examples, the processor is further configured to execute instructions in the memory that cause the processor to perform receiving authentication data, wherein the authentication data is associated with the player, the viewer, or both, and authenticating, based on the received authentication data, the player, the viewer, or both.

Some embodiments relate to at least one non-transitory computer-readable storage medium storing processor-executable instructions that, when executed by at least one computer hardware processor, cause the at least one computer hardware processor to perform the acts of receiving a video stream of gameplay of a video game, wherein the video game is being played by a player using a first computing device, broadcasting the received video stream to a second computing device associated with a viewer, receiving, from the second computing device, data indicative of a request to modify a video game asset associated with a second account of the viewer so that the video game asset is available to the player through a first account of the player, and processing the received data to cause the video game asset to be available to the player through the first account.

In some examples, processing the data includes generating, based on the received data, a request to modify the first account, the second account, or both, so that the video game asset is available to the player through the first account, and transmitting the request to one or more third computing devices associated with the video game.

In some examples, the one or more third computing devices associated with the video game include a video game server providing one or more aspects of the video game.

In some examples, processing the data includes modifying the first account, the second account, or both, so that the video game asset is available to the player through the first account.

In some examples, the computer-readable storage medium stores processor-executable instructions that, when executed by at least one computer hardware processor, cause the at least one computer hardware processor to perform the acts of determining, based on the received data, a time period for which the player is to have access to the video game asset, and processing the received data includes processing the received data to cause the video game asset to be available to the player through the first account for the time period.

In some examples, the computer-readable storage medium stores processor-executable instructions that, when executed by at least one computer hardware processor, cause the at least one computer hardware processor to perform the acts of receiving, from the first computing device, second data indicative of the player using the video game asset, and processing the received second data to remove access to the video game asset from both the first account and the second account.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
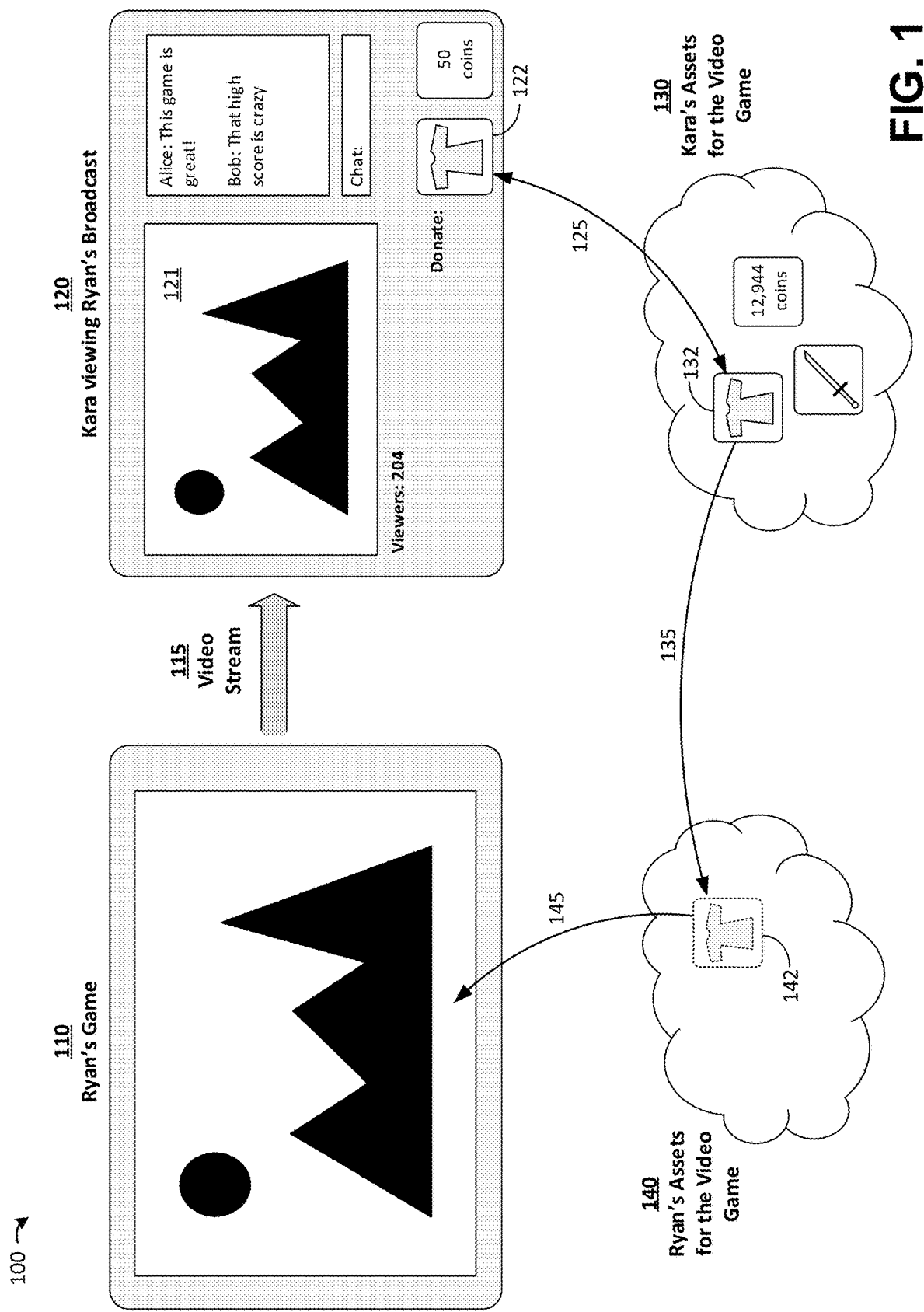
FIG. 1 is a diagram illustrating a process of supplying video game assets from a viewer of a video game broadcast to a host of the video game broadcast, according to some embodiments.

As discussed above, streaming platforms allow a player of a game to broadcast video of their gameplay to an audience. The player in this scenario is often referred to as a "streamer," and in many cases a streamer may overlay or otherwise supplement the video of the game with other content such as video of the streamer or their environment. Members of the audience (e.g., often referred to as "viewers") may view the video broadcast independently of the game and/or the platform on which the streamer is playing, typically by accessing an application or a web page provided by the streaming platform. In some cases, a streaming platform provides functionality in addition to the video broadcast such as a chat room, which allows viewers to interact with the streamer and other viewers.

The inventors have recognized and appreciated that viewers of a video broadcast of a video game are limited to a passive role with respect to the game they are viewing, even if the viewers themselves also play the same game. While the viewers may be able to comment or otherwise interact with others through the streaming platform, these actions may have no direct bearing on the gameplay of the streamer and/or upon the viewer's own experience within the game. For instance, the viewers may independently play a video game prior to watching that same game being streamed, but may conventionally have no way for such prior gameplay to affect present gameplay of the streamer, despite the gameplay being of the same video game. As another example, viewers may provide input relating to the gameplay, such as collectively voting for an action for the streamer to take in the game, but such actions only indirectly affect the gameplay of the streamer because they do not interact with the mechanics of the game itself.

The inventors have developed techniques for managing video game assets of viewers and hosts of video game broadcasts. These techniques may allow assets for a video game to be transferred, shared, created, used, and/or the like within the video game as a result of activity that occurs through a streaming platform and not within the video game itself. For example, the techniques may allow a viewer who has previously played a video game and obtained certain assets within that game to supply one or more of those assets to a streamer who is currently streaming gameplay of the same game. As another example, the techniques may allow a viewer to obtain an asset for a video game as a result of participating in a broadcast of gameplay of that video game.

As a further non-limiting example, a user may play a character-based game in which their character obtains a particular item. Subsequently, that user may be viewing a streamer playing the same game. Through an interface provided by the streaming platform, which will be described further below, the user may give or loan the previously obtained item to the streamer so that the streamer can use the item within the game during the stream. The user may, as a result, no longer have use of the item in their own game, at least for a time (e.g., while the item is loaned to the streamer). In this manner, the techniques described herein could be considered to blur the boundaries between playing and streaming a game, thereby allowing users to participate in a video game's ecosystem outside of the game itself.

Following below are more detailed descriptions of various concepts related to, and embodiments of, techniques for managing video game assets of viewers and hosts of video game broadcasts. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a diagram illustrating a process of supplying video game assets from a viewer of a video game broadcast to a host of the video game broadcast, according to some embodiments. As discussed further below, the techniques described herein may provide numerous use cases in which video game assets are managed as a result of user action and/or events that occur on a streaming platform. Accordingly, the illustrative process 100 of FIG. 1 is provided as a non-limiting example simply to demonstrate one such use case.

In the example of FIG. 1, a user Ryan is playing a video game and is streaming video of the gameplay to a streaming platform. Ryan's game 110 may be played on any suitable system, including a desktop computer, a gaming console, a tablet, a mobile device, or the like. In some embodiments, Ryan's game 110 may be played on a dedicated game console, e.g., PLAYSTATION®3, PLAYSTATION®4, or PLAYSTATION®VITA manufactured by Sony Computer Entertainment, Inc.; WII™, WII U™, NINTENDO 2DS™, NINTENDO 3DS™, or NINTENDO SWITCH™ manufactured by Nintendo Co., Ltd.; or XBOX®, XBOX 360®, or XBOX ONE® manufactured by Microsoft Corp. In some embodiments, Ryan's game 110 can be played on a computer configured to run a virtual reality (VR) platform, such as those provided by Oculus, HTC, Sony, and/or the like, and discussed further herein. In other embodiments, Ryan's game 110 can be played on a general purpose desktop or laptop computer. In other embodiments, Ryan's game 110 can be played on a server connected to a computer network. In other embodiments, Ryan's game 110 can be played using user equipment. The user equipment can communicate with one or more radio access networks and/or with wired communication networks. The user equipment can be a cellular phone. The user equipment can also be a smartphone providing services such as word processing, web browsing, gaming, and/or the like. The user equipment can also be a tablet computer providing network access and most of the services provided by a smartphone. The user equipment can operate using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, spatial positioning information (e.g., roll, pitch, yaw, etc.), profile information, or other location information. Irrespective of the type of device, the device being used to play Ryan's game 110 may be configured (via hardware, software, or a combination of hardware and software) to capture video of the video game as Ryan is playing it, and to transmit the captured video 115 (optionally after a step of video and/or audio encoding and/or decoding) to a streaming platform 120.

In the example of FIG. 1, the streaming platform 120 provides an online video broadcast that viewers may access through suitable means. For instance, the streaming platform may provide a web site through which users can select and view Ryan's video stream, and/or the streaming platform may be installed as an application that users can execute and use to view the video stream. In the example of FIG. 1, the video of Ryan's gameplay 121 is shown alongside a chat window with which viewers can interact with one another.

As shown in FIG. 1, the user interface (UI) of the streaming platform 120 provides two UI buttons to allow Kara to donate an in-game item to Ryan. The streaming platform may have previously contacted a server or other device that manages assets for the video game in question to determine whether Kara has any items that could be donated to Ryan (e.g., via communication path 125). Kara's managed video game assets are represented in FIG. 1 by the storage cloud 130, and include a shirt item, a number of coins, and a sword in this non-limiting example, each of which Kara has previously obtained through playing the same video game that Ryan is currently playing and streaming.

As a result of the streaming platform receiving one or more indications of sharable items that Kara has available, the streaming platform 120 produces the aforementioned UI buttons to allow Kara to donate these items to Ryan if she so chooses. As shown, the available items to be donated to Ryan need not precisely mirror the items that Kara has available. In particular, the sword asset that Kara has available is not available to be donated. Reasons for this may be that Kara has indicated to the video game that the sword is not an item she ever wishes to share, or that the video game does not allow sharing of this item. In addition, while Kara has 12,944 coins available in the video game, the streaming platform provides Kara with a way to donate 50 coins at a time so that Kara need not donate all of her coins should she wish to give some portion of the coins to Ryan. While this illustrative example allows Kara to donate items through UI buttons, this is for exemplary purposes and is not intended to be limiting. Other techniques can be used to allow Kara to select the sharable items, such as radio buttons, list boxes, menus, and/or the like.

In the example of FIG. 1, Kara provides input to the streaming platform 120 to indicate that she wishes to donate the shirt item to Ryan. As a result, an instruction is provided via communication path 125 to the server or other device managing Kara's assets for this video game indicating that the shirt asset should be transferred to Ryan's assets for the video game. In the example of FIG. 1, Ryan's assets for the video game are represented by storage cloud 140, and ownership of the shirt asset 132 is transferred to Ryan's assets to produce item 142. While no other assets are shown in the storage cloud 140, this is exemplary purposes only as the storage cloud 140 may include various other assets. In some examples, Ryan and Kara's assets may both be stored by the same server or group of servers and, as such, there may be no data transfer per se to change ownership. For example, the system may simply modify data associated with the two users and their assets. The two separate storage clouds 130 and 140 are therefore shown simply for the purposes of illustration.

Upon Ryan receiving the shirt item 142, one or more servers or devices relating to the video game may transmit data (e.g., one or more messages) via communication path 145 to Ryan's game 110 to indicate that Ryan's assets now include the shirt. In some cases, Ryan's game may perform an action in response to receiving such data (e.g., a message could appear on Ryan's screen saying "Kara donated a shirt!"). Once Ryan has the shirt asset loaned and/or associated with his account, Ryan may make use of the shirt asset through the video game Ryan is playing (e.g., equip a character with the shirt) in the same way as if Ryan had himself obtained the shirt through gameplay. As described further herein, assets may be donated, loaned for use, and/or the like, and therefore different assets can be used to impact gameplay in different manners.

Figure 2:
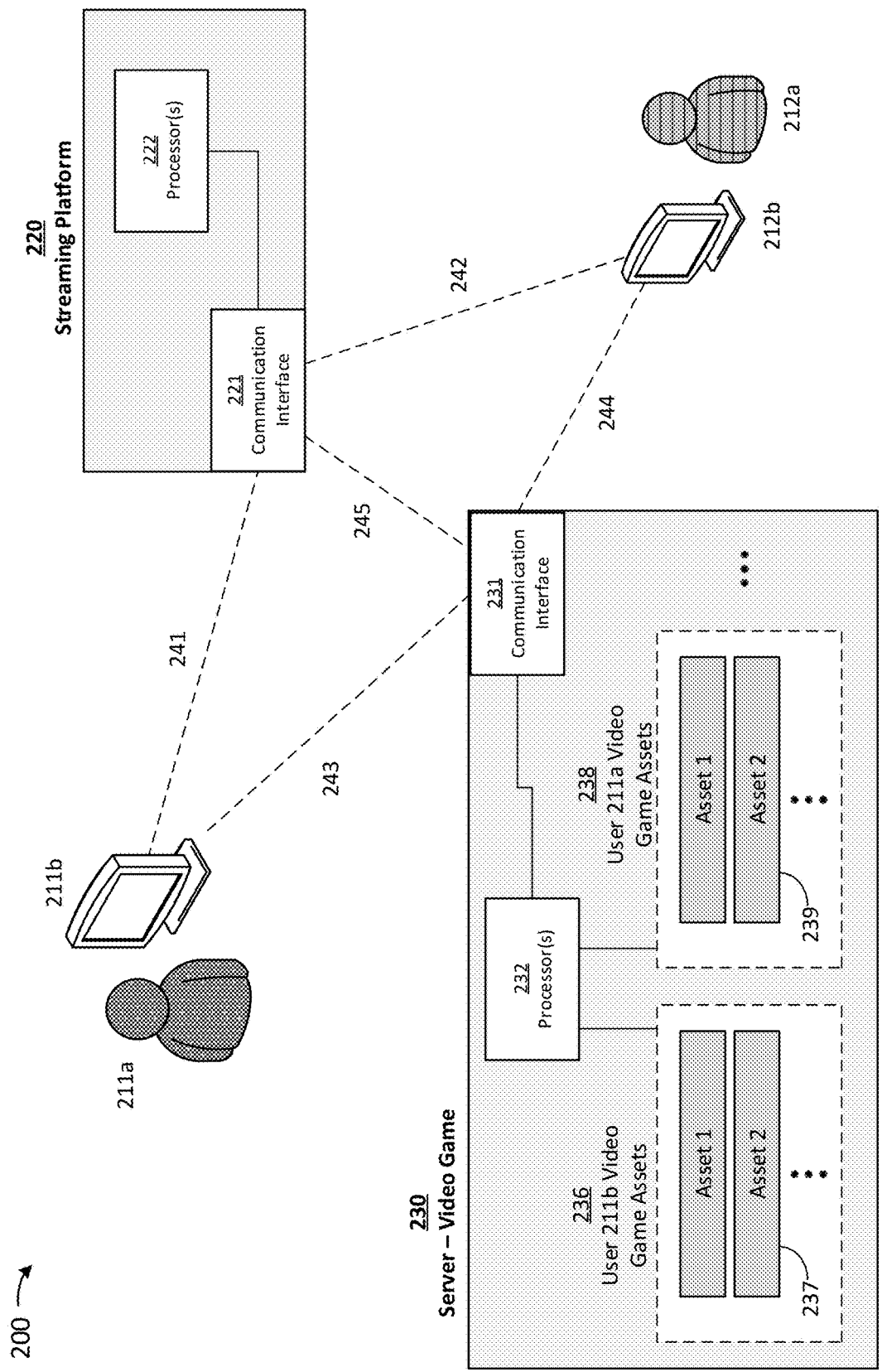
FIG. 2 illustrates a system for managing video game assets according to instructions provided by a streaming platform, according to some embodiments.

FIG. 2 illustrates a system for managing video game assets according to instructions provided by a streaming platform, according to some embodiments. System 200 includes a streaming platform 220 and a server 230 which manages assets for a video game (referred to henceforth as simply "the video game"). Users, including a streamer 211*a* and a viewer 212*a*, may connect to the streaming platform to, amongst other possible functions, broadcast a video stream of gameplay of a video game, or view another user's video stream of gameplay of a video game.

Users may transfer data to and from server 230 as a result of playing the video game (e.g., via communication paths 243 and 244) and thereby cause changes to a user's stored assets for the video game. Such data transfer may occur directly between server 230 and a user's computing device (e.g., computing device 211*b* of streamer 211*a*) executing the video game (as shown by paths 243 and 244 in FIG. 2), and/or may occur between server 230 and another server associated with the video game and to which the user's computing device is connected. In either case, components of the video game may transfer data relating to assets to and/or from the server 230, irrespective of which device is executing those components.

As referred to herein, an asset for a video game may refer to any data associated with the video game for a particular user. For instance, video game assets may include data regarding the user's progress within the game (e.g., flags indicating whether portions of the game have been completed and/or values indicating a degree to which portions of the game have been completed), an in-game score (e.g., experience points (XP)), in-game items (e.g., skins, songs, weapons, characters, abilities, and/or other in-game items), an amount of an in-game currency (e.g., in-game money), or combinations thereof.

According to some embodiments, operations performed by server 230 as a result of gameplay of a user may include: creating one or more assets, removing one or more assets, changing ownership of one or more assets, changing one or more attributes of one or more assets, or the like. It will be appreciated that there are numerous ways to implement such operations and that the techniques described herein are not limited to any particular approach. For example, creating an asset could include creation of a data structure for the asset. As another example, creating an asset could include adjusting one or more existing values stored on server 230 to indicate the asset is now loaned to and/or owned by a new user (when the new user previously did not have access to the asset). Operations performed on one or more assets by server 230 may, for instance, be triggered by events occurring in gameplay or may be triggered when a user saves a state of their game.

According to some embodiments, computing device 211*b* may include any suitable computing device configured to execute one or more components of a video game. Illustrative computing devices may include a desktop computer, a mobile device, a tablet, or a gaming console.

In some embodiments, execution of various components of the video game may be divided up between computing device 211*b* and any other devices in any suitable manner, which may include server 230 executing components of the video game. For instance, in some embodiments, primary gameplay aspects of the video game (e.g., rendering of graphics and audio, generation of gameplay state, etc.) may be executed on the computing device 211*b* and the server 230 may be used and/or provided simply for the purposes of managing assets of the user for the video game. In some embodiments, computing device 211*b* may render graphics and/or audio locally but obtain a generated gameplay state from the server 230 and/or some other server or computing device (e.g., processor(s) 232 may generate said gameplay state in whole or in part, as there is no requirement that server 230 be limited in functionality solely to asset management).

In some embodiments, components of the video game executing on computing device 211*b* may be configured to provide authentication information. For example, authentication information associated with streamer 211*a* can be provided to the server 230 to gain access to the asset management functions of the server, to gain access to components of the video game being executed on the server 230, and/or the like.

According to some embodiments, computing device 211*b* may be configured to broadcast video (which may include associated audio) to the streaming platform 220 via a suitable communication link 241. In some embodiments, computing device 211*b* executes a streaming client that captures video of gameplay in real-time and transmits captured video to the streaming platform. For instance, computing device 211*b* may execute an application associated with the streaming platform 220 into which the streamer 211*a* provides authentication information for an account associated with their streaming activities. This authentication information may allow the streaming platform 220 to receive video from a computing device and broadcast the video so that the resulting broadcast is associated with a streaming account owned by the streamer 211*a*.

In some embodiments, computing device 211*b* may be configured to perform video and/or audio decoding and/or encoding to produce an appropriate video stream for upload. For example, captured video and audio of gameplay by computing device 211*b* may have a data rate that is higher than desired for streaming purposes. Accordingly, computing device 211*b* may be configured to re-encode the video and/or audio to a lower bit rate (which may include encoding at a lower resolution and/or frame rate) in preparation for transmission of the audio and video to the streaming platform 220. In some embodiments, streaming platform 220 may be configured to perform video and/or audio decoding and/or encoding of video and/or audio received from the computing device 211*b* prior to broadcasting the video as a stream.

According to some embodiments, streaming platform 220 may be configured to generate content that includes streaming video received from computing device 211*b*, where said content may be accessed by the computing device 212*b* of a viewer in any suitable way. In some embodiments, streaming platform 220 may generate a web page in which the streaming video is arranged, allowing the viewer 212*a* to view the broadcast via any computing device 212b that is capable of viewing web pages (e.g., mobile device, tablet, desktop computer, or the like). In some embodiments, streaming platform 220 may generate content configured to be received by a suitable application associated with the streaming platform. In some use cases, the computing device 211b and the computing device 212b may be executing the same streaming application, yet streamer 211a is operating the application executed by computing device 211b to produce a video stream of gameplay of a video game (e.g., in a first user interface), while viewer 212a is operating the same application executed by computing device 212b to view the video stream (e.g., in a second user interface). Such an application may be viewed as operating as a client in a client-server arrangement with streaming platform 220 as the server.

According to some embodiments, streaming platform 220 may be configured to access server 230 using authentication associated with, and provided by, streamer 211a and viewer 212a. Each of the users may have an account associated with the video game and an account associated with the streaming platform and may provide to the streaming platform authentication information for the account associated with the video game. This may allow the streaming platform 220 to determine which assets for the video game are owned by a user that is connected to the streaming platform by sending and receiving messages to/from the server 230 using the user's authentication information.

According to some embodiments, details received from server 230 by streaming platform 220 in response to an inquiry by platform 220 regarding assets of a user who plays the video game may include: images, sounds or video associated with the asset (which the streaming platform 220 may render to the user through a user interface), text associated with the asset (e.g., a name, description, or the like), a level of rarity of the asset within the game, which options are available to the user in terms of interacting with the asset (e.g., whether the user has the option to give the asset, loan the asset, spend the asset, etc.), or combinations thereof.

According to some embodiments, streaming platform 220 may, based on information received from server 230, identify one or more actions that can be performed with respect to an asset owned by the viewer 212a, the asset being associated with the video game that the user is currently viewing in a live stream. In some cases, these actions may be indicated by the details received by the streaming platform 220 from the server 230. In other cases, actions may be inferred by the processor(s) 222 of the streaming platform 220 based on the type of asset in question or other received details regarding the asset.

In some embodiments, assets may be given or loaned from the viewer 212a to the streamer 211a as a result of user input provided by the viewer 212a to a user interface presented by computing device 212b. One example of giving an asset is discussed above in relation to FIG. 1. Loaning of an asset may include the same steps as giving an asset in addition to server 230 storing information that, at a particular future date and/or time, the asset is to be automatically given back to the viewer. The duration of a loan may be defined by nature of the asset (i.e., according to the video game's rules) and/or may be defined by the streaming platform (e.g., the streaming platform limits the possible durations of a loan, which could also in some cases be set by the streamer's preferences saved by the streaming platform).

In some embodiments, assets may be of a type such that they are used up once activated by the viewer 212a. For instance, some assets obtained through gameplay of the video game may represent in-game effects or results that occur when the asset is used and cause the asset to be lost upon said effects or results taking place. As one example, a firework asset (e.g., asset 237) may be obtained by viewer 212a during gameplay of the video game and the streaming platform 220 may present viewer 212a with the option to use the firework asset while viewer 212a is watching streamer 211a stream gameplay of the video game. When viewer 212a provides input to use the firework asset, the streaming platform may indicate the asset 237 is being used to the server 230, which may send instructions to the computing device 211b (and/or any other server or device executing the video game for streamer 211a) indicating the firework asset has been used for streamer 211a's gameplay. As a result, the computing device 211b (and/or any other server or device executing the video game for streamer 211a) may produce an effect (e.g., display fireworks on the screen) within the game, which viewer 212a may observe through the stream of streamer 211a's gameplay. In this manner, viewer 212a's experience is to, while watching a stream of gameplay of a video game, provide input to use an asset and shortly thereafter see an effect of the asset's use in the stream. Streamer 211a will also observe this result, since streamer 211a is playing the video game on computing device 211b.

In some embodiments, one or more assets stored by server 230 may be modified (e.g., created, deleted, altered, ownership changed, or the like) due to an in-game event rather than input from viewer 212a. For instance, viewers of a stream of gameplay of a video game may receive some kind of reward when particular events occur within the game if they are viewing the stream when the event occurs. As one example, streamer 211a may be broadcasting a stream of gameplay of the video game and achieve a high score during the stream. If viewer 212a is viewing user's 211a stream via the streaming platform 220 when the high score is achieved, this may cause the viewer 212a to receive an asset relating to the high score (e.g., user flair that says "I was there when Ryan got the high score!"). One approach to producing this result is for the computing device 211b (and/or any other server or device executing the video game for streamer 211a) to send a message to streaming platform 220 indicating that such an event has occurred and the streaming platform adding assets for all of the viewers of the stream for the video game by accessing server 230 for each of these viewers.

In some embodiments, one or more assets stored by server 230 may be modified (e.g., created, deleted, altered, ownership changed, or the like) as a result of one or more actions taken by the streamer 211a. In some cases, the computing device 211b may be configured (within the video game being played or otherwise) to cause modification of assets of the streamer 211a and/or a viewer 212a in response to user input. As one example, streamer 211a may wish to give an asset to a viewer of their stream, and as such the computing device 211b may be configured to instruct the server 230 to give or loan one or more assets from the streamer 211a to the viewer 212a based on user input and/or as triggered by certain events within the video game being streamed. Such a process may be performed in the same way as transfers of assets from the viewer 212a to the streamer 211a as discussed above. In some cases, the above approach may facilitate trading between the streamer 211a and the viewer 212a wherein the two users exchange assets with one another as part of a trade.

Given the wide range of video game assets that may be envisioned, it may be appreciated that many possible operations may be possible that have not been expressly described herein. As additional examples, viewers of a stream may give instances of an in-game object to a streamer, causing the streamer to gain experience points for each such object received; or a viewer of a stream may loan an extremely powerful weapon within the video game to the streamer so that the streamer can have access to the weapon and demonstrate to many viewers how effective the weapon is whilst the viewer receives praise from the streamer for the loan. As another example, viewers can donate and/or loan assets that have been built and/or customized by the viewer. For example, the shirt item discussed in conjunction with FIG. 1 could include an image that was drawn or created by the viewer. As another example, a weapon can be improved, customized and/or built based on gameplay and/or from other game asset components. When such a customized asset is made available to the player, the assets can provide the player with new abilities while also showcasing the viewer's gameplay (e.g., the viewer's creativity and/or skill).

Moreover, it will be appreciated that the illustrative system architecture shown in FIG. 2 may take various other forms not shown so long as the functionality described is provided. As one non-limiting example, a single server may be envisioned that performs the functions of streaming platform 220 and server 230 so that the single server is a combined gaming and streaming platform.

Figure 3:
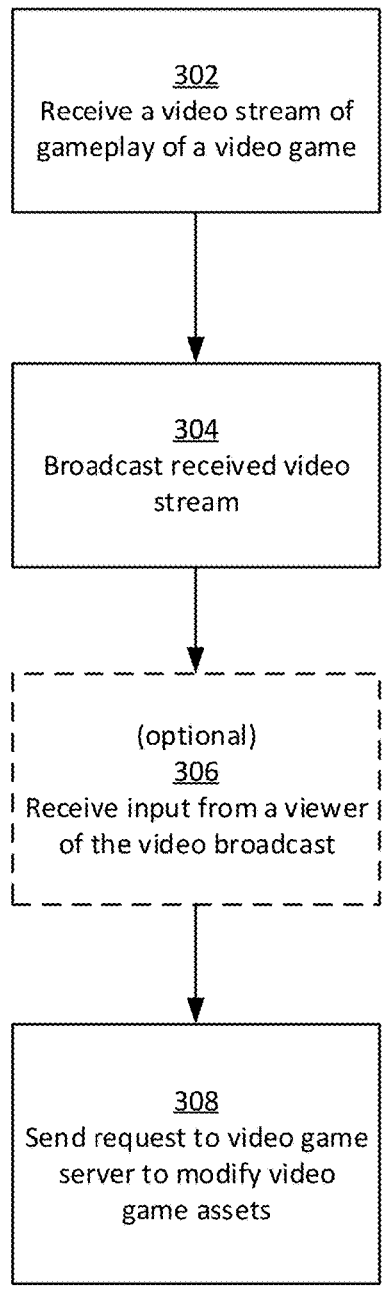
FIG. 3 is a flowchart of a method of managing video game assets of viewers and hosts of video game broadcasts, according to some embodiments.

FIG. 3 is a flowchart of a method of managing video game assets of viewers and hosts of video game broadcasts, according to some embodiments. Method 300 may be performed, for example, by one or more processors of a streaming platform such as streaming platform 220 shown in FIG. 2. In act 302, the device performing method 300 receives a video stream of gameplay of a video game. The stream may be encoded in any suitable way and act 302 may include a step of modifying the received video for purposes of rebroadcast, which occurs in act 304. Broadcasting the received video stream in act 304 need not include transmitting precisely the video stream received in act 302; rather, video and/or audio may be re-encoded, various filters may be applied to the video stream, or the like before broadcast.

In optional act 306, input is received from a viewer of the broadcast of act 304 indicating that an asset of the video game being streamed is to be modified in some manner. The input may specify a particular type of modification as discussed above, such as a loan, a gift, a use, etc.

In act 308, the device performing method 300 sends a request to a server associated with the video game to modify the video game assets of a viewer of the broadcast of act 304. In some cases, this request may cause the server to modify additional assets as a consequence. For example, when the request relates to giving or loaning an asset from one user to another (e.g., from a streamer to a viewer, or from a viewer to a streamer), the request may in some cases cause modifications to multiple assets. In cases where act 306 was performed, act 308 may include sending a request to modify an asset of that viewer.

Figure 4:
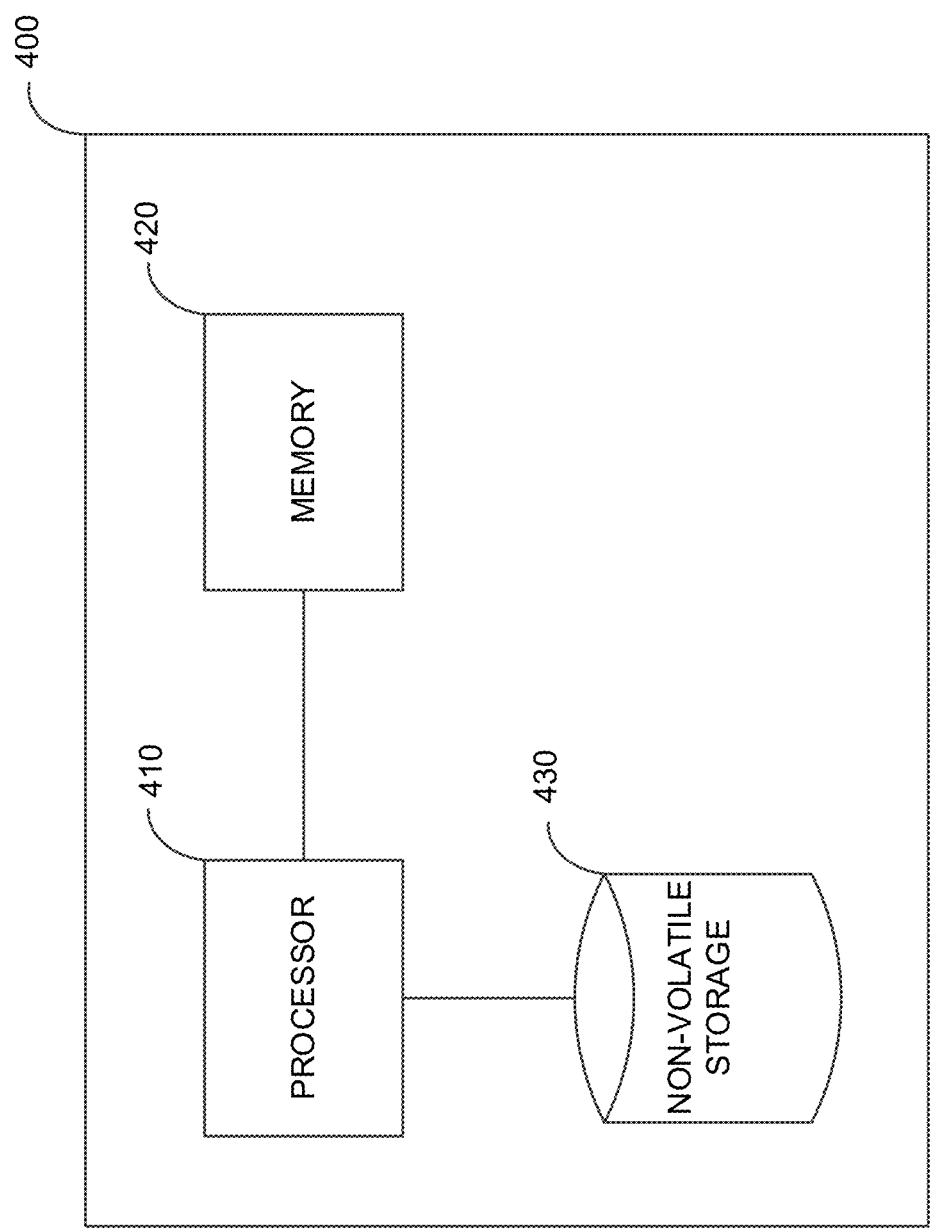
FIG. 4 illustrates an example of a computing system environment on which aspects of the invention may be implemented.

An illustrative implementation of a computer system 400 that may be used to perform any of the aspects of managing video game assets of viewers and hosts of a video game broadcast is shown in FIG. 4. The computer system 400 may include one or more processors 410 and one or more non-transitory computer-readable storage media (e.g., memory 420 and one or more non-volatile storage media 430). The processor 410 may control writing data to and reading data from the memory 420 and the non-volatile storage device 430 in any suitable manner, as the aspects of the invention described herein are not limited in this respect.

To perform functionality and/or techniques described herein, the processor 410 may execute one or more instructions stored in one or more computer-readable storage media (e.g., the memory 420, storage media, etc.), which may serve as non-transitory computer-readable storage media storing instructions for execution by the processor 410.

In connection with techniques described herein, code used to, for example, broadcast a video stream, display assets owned by a viewer for a video game being streamed, transmit viewer input with respect to an asset and a video stream to a video game server, perform modification of asset data, etc. may be stored on one or more computer-readable storage media of computer system 400. Processor 410 may execute any such code to provide any techniques for managing video game assets of viewers and hosts of a video game broadcast as described herein. Any other software, programs or instructions described herein may also be stored and executed by computer system 400. It will be appreciated that computer code may be applied to any aspects of methods and techniques described herein. For example, computer code may be applied to interact with an operating system to encode video, display video, or transmit messages through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The invention claimed is:

1. A computer-implemented method of sharing a video game asset associated with a viewer with a player of a video game broadcast, the method comprising using at least one computer hardware processor to perform:
   receiving a video stream of gameplay of a video game, wherein the video game is being played by a player using a first computing device;
   broadcasting the received video stream to a second computing device associated with a viewer for display in a graphical user interface (GUI);
   while the video game is being played by the player:
      receiving, from the second computing device based on input provided through the GUI, data indicative of a request to modify a video game asset associated with a second account of the viewer so that the video game asset is available to the player through a first account of the player; and
      processing the received data to cause the video game asset to be available to the player through the first account.

2. The computer-implemented method of claim 1, wherein processing the data comprises:
   generating, based on the received data, a request to modify the first account, the second account, or both, so that the video game asset is available to the player through the first account; and
   transmitting the request to one or more third computing devices associated with the video game.

3. The computer-implemented method of claim 2, wherein the one or more third computing devices associated with the video game comprise a video game server providing one or more aspects of the video game.

4. The computer-implemented method of claim 1, wherein processing the data comprises modifying the first account, the second account, or both, so that the video game asset is available to the player through the first account.

5. The computer-implemented method of claim 1, further comprising:
   determining, based on the received data, a time period for which the player is to have access to the video game asset; and
   processing the received data comprises processing the received data to cause the video game asset to be available to the player through the first account for the time period.

6. The computer-implemented method of claim 1, further comprising:

receiving, from the first computing device, second data indicative of the player using the video game asset; and processing the received second data to remove access to the video game asset from both the first account and the second account.

7. The computer-implemented method of claim 1, further comprising:

receiving authentication data, wherein the authentication data is associated with the player, the viewer, or both; and authenticating, based on the received authentication data, the player, the viewer, or both.

8. An apparatus configured to share a video game asset associated with a viewer with a player of a video game broadcast, the apparatus comprising a processor in communication with a memory, the processor being configured to execute instructions stored in the memory that cause the processor to perform:

receiving a video stream of gameplay of a video game, wherein the video game is being played by a player using a first computing device;

broadcasting the received video stream to a second computing device associated with a viewer for display in a graphical user interface (GUI);

while the video game is being played by the player:

receiving, from the second computing device, data indicative of a request to modify a video game asset associated with a second account of the viewer so that the video game asset is available to the player through a first account of the player; and processing the received data to cause the video game asset to be available to the player through the first account.

9. The apparatus of claim 8, wherein processing the data comprises:

generating, based on the received data, a request to modify the first account, the second account, or both, so that the video game asset is available to the player through the first account; and transmitting the request to one or more third computing devices associated with the video game.

10. The apparatus of claim 9, wherein the one or more third computing devices associated with the video game comprise a video game server providing one or more aspects of the video game.

11. The apparatus of claim 8, wherein processing the data comprises modifying the first account, the second account, or both, so that the video game asset is available to the player through the first account.

12. The apparatus of claim 8, wherein the processor is further configured to execute instructions in the memory that cause the processor to perform:

determining, based on the received data, a time period for which the player is to have access to the video game asset; and processing the received data comprises processing the received data to cause the video game asset to be available to the player through the first account for the time period.

13. The apparatus of claim 8, wherein the processor is further configured to execute instructions in the memory that cause the processor to perform:

receiving, from the first computing device, second data indicative of the player using the video game asset; and processing the received second data to remove access to the video game asset from both the first account and the second account.

14. The apparatus of claim 8, wherein the processor is further configured to execute instructions in the memory that cause the processor to perform:

receiving authentication data, wherein the authentication data is associated with the player, the viewer, or both; and authenticating, based on the received authentication data, the player, the viewer, or both.

15. At least one non-transitory computer-readable storage medium storing processor-executable instructions that, when executed by at least one computer hardware processor, cause the at least one computer hardware processor to perform the acts of:

receiving a video stream of gameplay of a video game, wherein the video game is being played by a player using a first computing device;

broadcasting the received video stream to a second computing device associated with a viewer for display in a graphical user interface (GUI);

while the video game is being played by the player:

receiving, from the second computing device based on an input provided through the GUI, data indicative of a request to modify a video game asset associated with a second account of the viewer so that the video game asset is available to the player through a first account of the player; and processing the received data to cause the video game asset to be available to the player through the first account.

16. The at least one non-transitory computer-readable storage medium of claim 15, wherein processing the data comprises:

generating, based on the received data, a request to modify the first account, the second account, or both, so that the video game asset is available to the player through the first account; and transmitting the request to one or more third computing devices associated with the video game.

17. The at least one non-transitory computer-readable storage medium of claim 16, wherein the one or more third computing devices associated with the video game comprise a video game server providing one or more aspects of the video game.

18. The at least one non-transitory computer-readable storage medium of claim 15, wherein processing the data comprises modifying the first account, the second account, or both, so that the video game asset is available to the player through the first account.

19. The at least one non-transitory computer-readable storage medium of claim 15, wherein the computer-readable storage medium stores processor-executable instructions that, when executed by at least one computer hardware processor, cause the at least one computer hardware processor to perform the acts of:

determining, based on the received data, a time period for which the player is to have access to the video game asset; and processing the received data comprises processing the received data to cause the video game asset to be available to the player through the first account for the time period.

20. The at least one non-transitory computer-readable storage medium of claim 15, wherein the computer-readable storage medium stores processor-executable instructions that, when executed by at least one computer hardware processor, cause the at least one computer hardware processor to perform the acts of:

receiving, from the first computing device, second data indicative of the player using the video game asset; and processing the received second data to remove access to the video game asset from both the first account and the second account.

* * * * *